United States Patent
Wilson, Jr.

(10) Patent No.: US 11,163,376 B2
(45) Date of Patent: Nov. 2, 2021

(54) ADJUSTABLE KEYBOARD

(71) Applicant: Thomas W. Wilson, Jr., Saratoga, CA (US)

(72) Inventor: Thomas W. Wilson, Jr., Saratoga, CA (US)

( * ) Notice: Subject to any disclaimer, the term of this patent is extended or adjusted under 35 U.S.C. 154(b) by 0 days.

(21) Appl. No.: 16/671,752

(22) Filed: Nov. 1, 2019

(65) Prior Publication Data

US 2020/0142502 A1    May 7, 2020

Related U.S. Application Data

(60) Provisional application No. 62/754,909, filed on Nov. 2, 2018, provisional application No. 62/767,987, filed on Nov. 15, 2018.

(51) Int. Cl.
*G06F 3/02* (2006.01)
*B41J 5/10* (2006.01)
*F16M 13/00* (2006.01)

(52) U.S. Cl.
CPC ............ *G06F 3/0208* (2013.01); *B41J 5/105* (2013.01); *G06F 3/0216* (2013.01); *F16M 13/00* (2013.01)

(58) Field of Classification Search
None
See application file for complete search history.

(56) References Cited

U.S. PATENT DOCUMENTS

| | | | | |
|---|---|---|---|---|
| 5,067,834 A * | 11/1991 | Szmanda | ................... | B41J 5/10 400/489 |
| 5,228,791 A | 7/1993 | Fort | | |
| 5,810,313 A * | 9/1998 | Armstrong | ............. | F16M 13/00 248/176.1 |
| 6,074,270 A * | 6/2000 | Wilcox | .................... | A63H 3/04 446/370 |
| 6,439,530 B1 * | 8/2002 | Schoenfish | ............. | B60R 11/02 248/346.06 |
| 7,828,489 B1 | 11/2010 | Hargreaves et al. | | |
| 2001/0022334 A1 | 9/2001 | Iwata et al. | | |
| 2003/0138278 A1 * | 7/2003 | Green | ...................... | B41J 5/105 400/472 |
| 2011/0175811 A1 | 7/2011 | Edmister | | |

(Continued)

FOREIGN PATENT DOCUMENTS

| | | | | |
|---|---|---|---|---|
| DE | 102010031070 A1 | 1/2012 | | |
| GB | 2203995 A * | 11/1988 | ............. | B41J 5/105 |

*Primary Examiner* — Jill E Culler

(74) *Attorney, Agent, or Firm* — David R. Stevens; Stevens Law Group

(57) ABSTRACT

The present invention extends adjustable keyboard components. A user can selectively adjust height, tilt, and other keyboard positioning aspects (e.g., pitch, tilt, roll, yaw etc.), to accommodate the specific preferences and/or physical or anatomical characteristics of the user. Keyboard adjustments can tailor a solid foundational position for the user's fingers and hands. The keyboard can include separate left and right modules. Adjustability and separability facilitate highly variable and independent movement of the user's left and right hands. Adjustments and re-adjustments allow a user to make a wide range of alterations to their typing position at any point in time based on circumstances and comfort. As such, adjustments and re-adjustments can (potentially significantly) reduce discomfort and/or injuries associated with repetitive motion.

20 Claims, 12 Drawing Sheets

(56) References Cited

U.S. PATENT DOCUMENTS

2011/0226920 A1\* 9/2011 Moses .................. G06F 3/0208
 248/346.01
2013/0300667 A1\* 11/2013 Linegar ................ G06F 1/1664
 345/168

\* cited by examiner (TOP VIEW)

(FRONT VIEW)

ADJUSTABLE KEYBOARD

CROSS-REFERENCE TO RELATED APPLICATIONS

This application claims the benefit of and priority to U.S. Provisional Patent Application Ser. No. 62/754,909, filed Nov. 2, 2018, the entire contents of which are expressly incorporated by reference. This application also claims the benefit of and priority to U.S. Provisional Patent Application Ser. No. 62/767,987, filed Nov. 15, 2018, the entire contents of which are expressly incorporated by reference.

BACKGROUND

1. Field of the Invention

This invention relates generally computer keyboards, and, more particularly, to adjustable computer keyboards.

2. Related Art

A keyboard is an integral component of computing devices and is typically a primary component used to input information and instructions into programs running on computing devices. Keyboards include an arrangement of unique keys used for text entry. Each key may be pressed singularly or in combination to produce a character, symbol, or function. Keyboards may also be used for computer gaming and may include special gaming features.

Extended use of a keyboard may cause user discomfort and/or (potentially serious) injury, such as, carpal tunnel syndrome, due to repetitive strain to the hands, wrists, arms, neck, and/or back. Some keyboards may also force fingers, hands, or wrists into unusual and/or unnatural positions. For example, a keyboard may force a user's hands closer together, causing the wrists to bend to the side unnaturally. In another example, keyboards may require arm extension or bending the arm upward at the wrist for the fingers to be able to reach the keys. Forcing fingers, hands, or wrists into unusual and/or unnatural positions can also contribute to and/or exacerbate discomfort and/or injury.

Accordingly, various keyboard configurations have been developed to provide more ergonomic support. These keyboard configurations can somewhat reduce strain and the potential for injury. However, these keyboard configurations typically present a single static version of a typing position. A static typing position cannot account for anatomical variations and positioning preferences of different individuals. Thus, static typing positions limit the efficacy and usefulness of such ergonomic keyboards by failing to fully address the major issue of repetitive motion.

BRIEF DESCRIPTION OF THE DRAWINGS

The specific features, aspects and advantages of the present invention will become better understood with regard to the following description and accompanying drawings where.

DETAILED DESCRIPTION

Figure 1A:
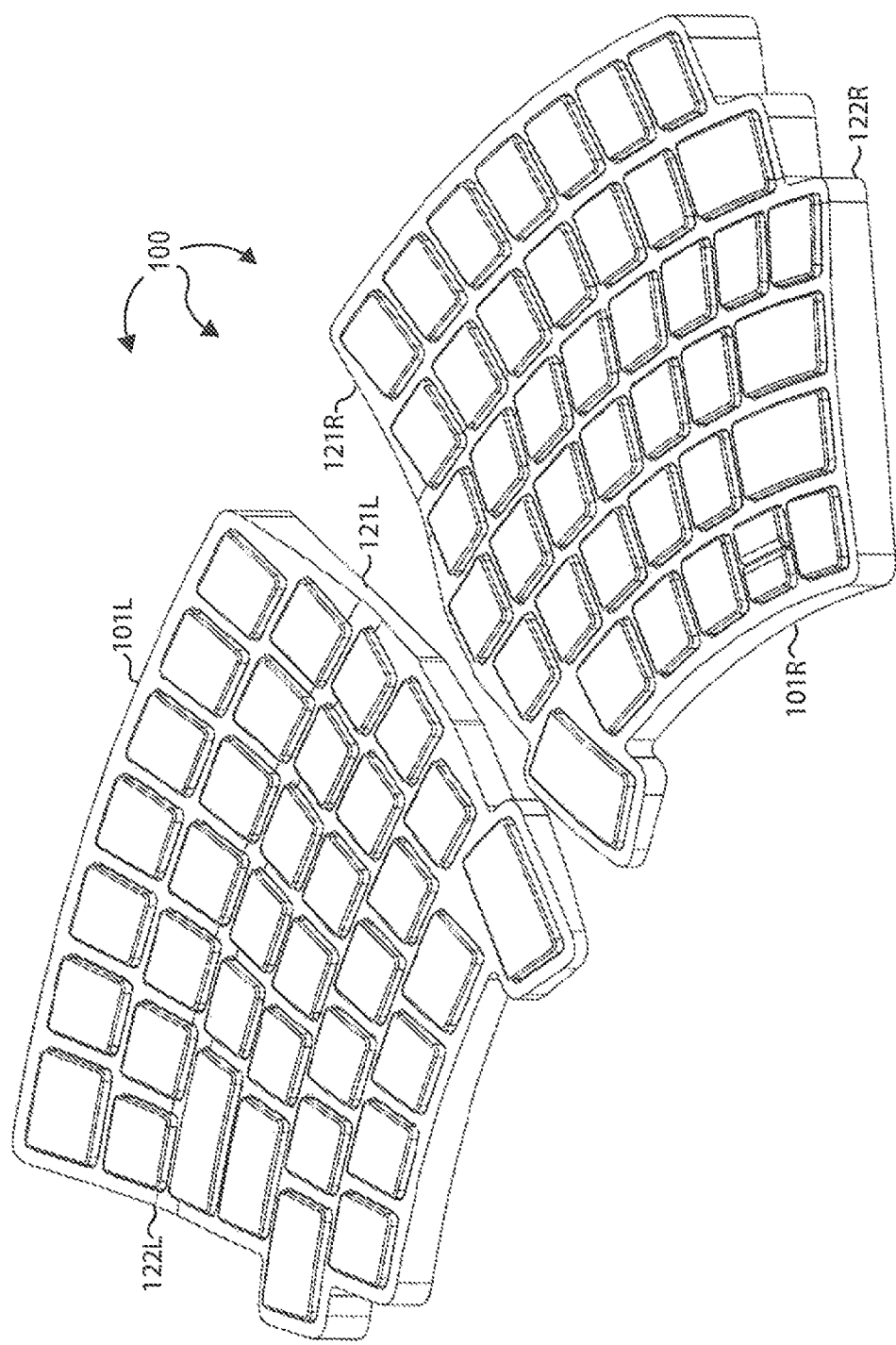
FIG. 1A illustrates a top perspective view of example left and right keyboard modules of a keyboard.

The present invention extends to a selectively adjustable keyboard. A user can selectively adjust height, tilt, and other keyboard positioning aspects (e.g., pitch, tilt, roll, yaw, etc.), to accommodate the specific preferences and/or physical or anatomical characteristics of the user. Keyboard adjustments can tailor a solid foundational position for the user's fingers and hands. The keyboard can include separate left and right modules. Adjustability and separability facilitate highly variable and independent movement of the user's left and right hands. Variable and independent movement between left and right hands can improve posture and typing position.

Adjustments and re-adjustments allow a user to make a wide range of alterations to their typing position at any point in time based on circumstances and comfort. As such, adjustments and re-adjustments can (potentially significantly) reduce discomfort and/or injuries associated with repetitive motion.

Keyboard modularity and (relatively smaller) footprint facilitates enhanced independent repositioning or translation of left and right modules in 3D space (i.e., pitch, tilt, roll, yaw). Accessories and/or built-in mechanisms can be used for repositioning and translation.

In some aspects, corresponding left and right base modules each include a container that is filled with media (e.g., PVC pellets, expanded polystyrene beads, or expanded polypropylene beads). Each media filled container (e.g., similar to a bean bag) includes and/or is mechanically coupled to a top plate and a bottom plate. Each top plate is configured to further couple to a corresponding input module (e.g., mechanically, magnetically, etc.). In one aspect, a media filled container can also include mechanical positioning components, such as, for example, a ball and socket joint, hinged plates, etc. In other aspects, a container includes mechanical positioning component but is not filled with media.

In further aspects, a base module does not include a container. Mechanical positioning components are directly connected to one or both of a top plate and a bottom plate.

An input module can include one or more of: a typing surface, a wrist pad, a modular input device, trackpad, mouse, etc. The module input device can be used for pointing, scrolling, and/or selection. For example, the top plate of a left base module can be configured to couple to a left keyboard module. Similarly, the top plate of a right base module can be configured to couple to a right keyboard module. Each bottom plate can include rubber feet for gripping to a surface, such as, a desk top.

Walls of each base module are constructed of an adjustable material, such as, fabric, plastic or vinyl. Subject to sufficient force, walls can be compressed or expanded to change the orientation of the top plate and corresponding change distribution of media within the base module. Adjustment mechanisms, such as, for example, a bean bag, ball and socket, one or more hinges, etc., can be included inside each base module and arranged between top and bottom plates. The adjustment mechanisms can be manipulated to change the orientation of a corresponding top plate. Media contained within the base module can support the orientation of the corresponding top plate after adjustment.

In one aspect, based on support from the contained media and/or mechanical components, adjustment mechanisms are manipulatable using an amount of force greater than the amount of force associated with using an input device, such as, typing on a keyboard. As such, after a top plate is oriented to a user's desired orientation, subsequent use of an input device, for example, typing on a correspondingly coupled keyboard module, is unlikely to alter the desired orientation.

FIG. 1A illustrates a top perspective view of example left and right keyboard modules of a keyboard 100. Keyboard 100 include keyboard module 101L (a left keyboard module) and right keyboard module 101R (a right keyboard module). Keyboard module 101L can corresponding to a left hand of a user and keyboard module 101R can correspond to a right hand of a user.

Either or both of keyboard module 101L and keyboard module 101R may include an adjustable typing surface, wrist pad, and modular input device for pointing, scrolling, and/or selection. A modular input device may include, for example, a stick, a trackball, a click wheel, a trackpad, a 3D input device, or any other such input device known to those in the art. Each of the typing surface, wrist pad, and modular input device may be independently adjusted to enable a user to uniquely optimize his or her typing position for the greatest comfort and ergonomic benefit. Such adjustments may be made manually by the user, or automatically.

In some aspects, for example, one or more sensors or arrays of sensors may measure a user's body and/or hand position to determine an optimal height, tilt, convexity, concavity, and the like, of the adjustable ergonomic keyboard. The sensors may communicate with a local or remotely-located processor to adjust keyboard module 101L and/or keyboard module 101R accordingly. In certain embodiments, keyboard module 101L and/or keyboard module 101R may be selectively manually or automatically locked into position upon final adjustment.

Keyboard module 101L and/or keyboard module 101R may be completely independent from one another and may communicate with each other via a high-reliability, low-latency wireless communication method, such as Bluetooth®, or any other such method or technique known to those in the art. Each module may communicate between one another and transmit to host or communicate independently to host. In some aspects, signals from keyboard module 101L and keyboard module 101R are communicated to a local or remotely-located processor for further processing.

Each of keyboard module 101L and/or keyboard module 101R can include a lightweight, slim profile having a shape configured to allow one module to be stacked onto the other. In this manner, embodiments of the invention may promote easy portability of the adjustable ergonomic keyboard as needed. The small size may also allow for greater range of positioning options on the desktop, and may enable attachment and integration of accessories or built-in mechanisms that allow for greater positioning options in 3D space (i.e., pitch, tilt, roll, yaw) for each module.

Further, each of the keyboard module 101L and keyboard module 101R can include rows of keys arranged in a substantially radial pattern to follow the natural curvature of finger placement in typing position. In addition, a home row of keys may have a convex surface, in addition to the rows of keys immediately adjacent to the home row. Use of a radial pattern in combination with convex key surfaces may provide greater user comfort and allow for easier vertical transitions with less finger translation during vertical and near-motion typing.

In some aspects, the number and function of higher key rows may have a concave surface in a substantially stadium orientation (i.e., keys rising vertically, along a convex surface). A stadium orientation can reduce finger translation in an extended typing motion for less frequently used keys.

In one aspect, keyboard modules are 3D shaped enclosures, for example, formed from sheet metal. The keyboard modules can also include 3D shaped keyboard mechanisms. A 3D shaped enclosure and a 3D shaped keyboard mechanism (e.g., key set) can be coupled via laser welding, glue, mechanical fasteners, or other mechanisms.

Figure 1B:
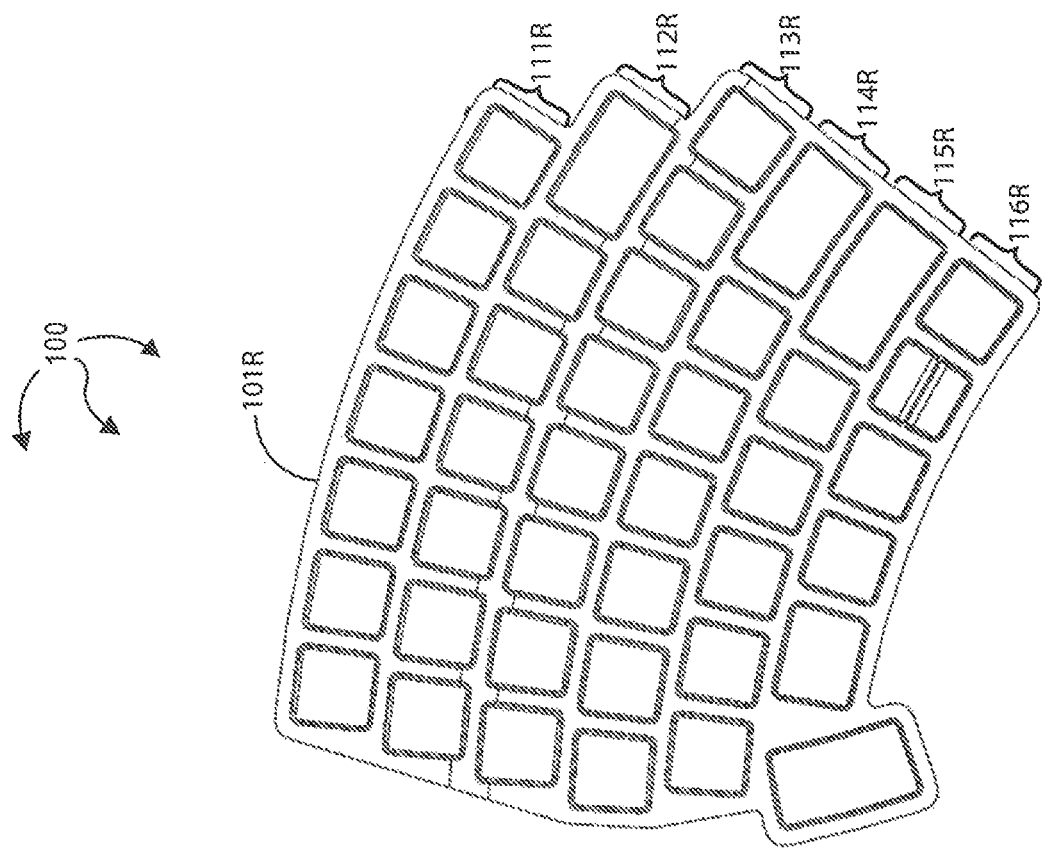
FIG. 1B illustrates a top view of the example left and right keyboard modules of the keyboard.

FIG. 1B illustrates a top view of the example left and right keyboard modules of the keyboard 100. Each of keyboard module 101L and keyboard module 101R can include rows of keys. For example, keyboard module 101L can include key rows 111L-116L. Similarly, keyboard module 101R can include key rows 111R-116R.

Placement of key rows 111L-116L side-by-side with key rows 111R-116R can collectively arrange the keys of keyboard 100 into a QWERTY-based layout, such as QWERTY, QWERTZ, AZERTY, or the like, or in a non-QWERTY based layout, such as Dvorak, Colemak, or the like, or in any other layout or configuration known to those in the art. In some aspects, each key may be independently programmable. Either or both of keyboard module 101L and keyboard module 101R may include a space bar oriented to substantially correspond to a natural thumb position when a user is in typing position.

In some aspects, each key includes a discrete mechanical switch that is surface-mountable on a board. A key may include an elastomeric or rubber dome molded with carbon pucks, supported by a scissor mechanism that allows for the key to remain horizontal during translation. Upon depressing the key, the rubber dome may deform to close a circuit on a circuit board beneath. This design may enable greater precision than traditional scissor-type designs.

In another aspect, one or more keys include a spring positioned to correspond to a center line of the key. Rails may guide the key to provide precision when the key is depressed. Use of springs can provide tactile feedback to the user and include a slimmer profile and be more compact than other designs. Use of springs in combination with rails may also enable greater precision than traditional scissor-type designs.

In some aspects, either or both of keyboard module 101L and keyboard module 101R may include an input device for moving the cursor on a host computer, such as a trackpad. In one embodiment, the trackpad may be integrated into a keyboard module such that it can be folded inward for storage and easily deployed outward for use. In certain embodiments, the trackpad may be positioned in an ergonomically favorable location, such as adjacent to the space bar.

In some aspects, each of keyboard module 101L and keyboard module 101R include a rising surface from inside to outside for all key rows. For example, keyboard module 101L can be thinner at edge 121L and thicker at edge 122L. Similarly, keyboard module 101R can be thinner at edge 121R and thicker at edge 122R. A rising surface from inside to outside can reduce vertical finger translation when accessing horizontal key positions.

As described, aspects include base modules providing adjustable support for corresponding keyboard modules. Keyboard modules can be fit over (and secured to) corresponding base modules via magnets, screws, adhesives, a press fit, or any other means known to those in the art.

As further described, a left or right base module may include one or more mechanisms to selectively adjust a position of a correspondingly attached left or right keyboard module. For example, in a dual plate arrangement, a first (bottom) plate contacts a flat surface such as a desk or table, while a second (top) plate may selectively adjust and couple to a corresponding keyboard module.

As additionally described, a base module can implement an adjustment mechanism between bottom and top plates. In other aspects, a base module includes an adjustment mechanism on an underside surface of the base module (e.g., under a bottom plate). The adjustment mechanism may include, for example, a motorized or manually-driven screw drive, a wedge, a spring, a cam, a linear motion interface or slider, a ball and socket, one or more hinged plates, an air bladder, a compressive or compliant material, a hydraulic adjustment mechanism, or any other such adjustment mechanism known to those in the art. An adjustment mechanism may or may not be arranged inside a container positioned between a top plate and a bottom plate. In one aspect, the container is filled with media. In another aspect, the container is not filled with media.

Figure 2A:
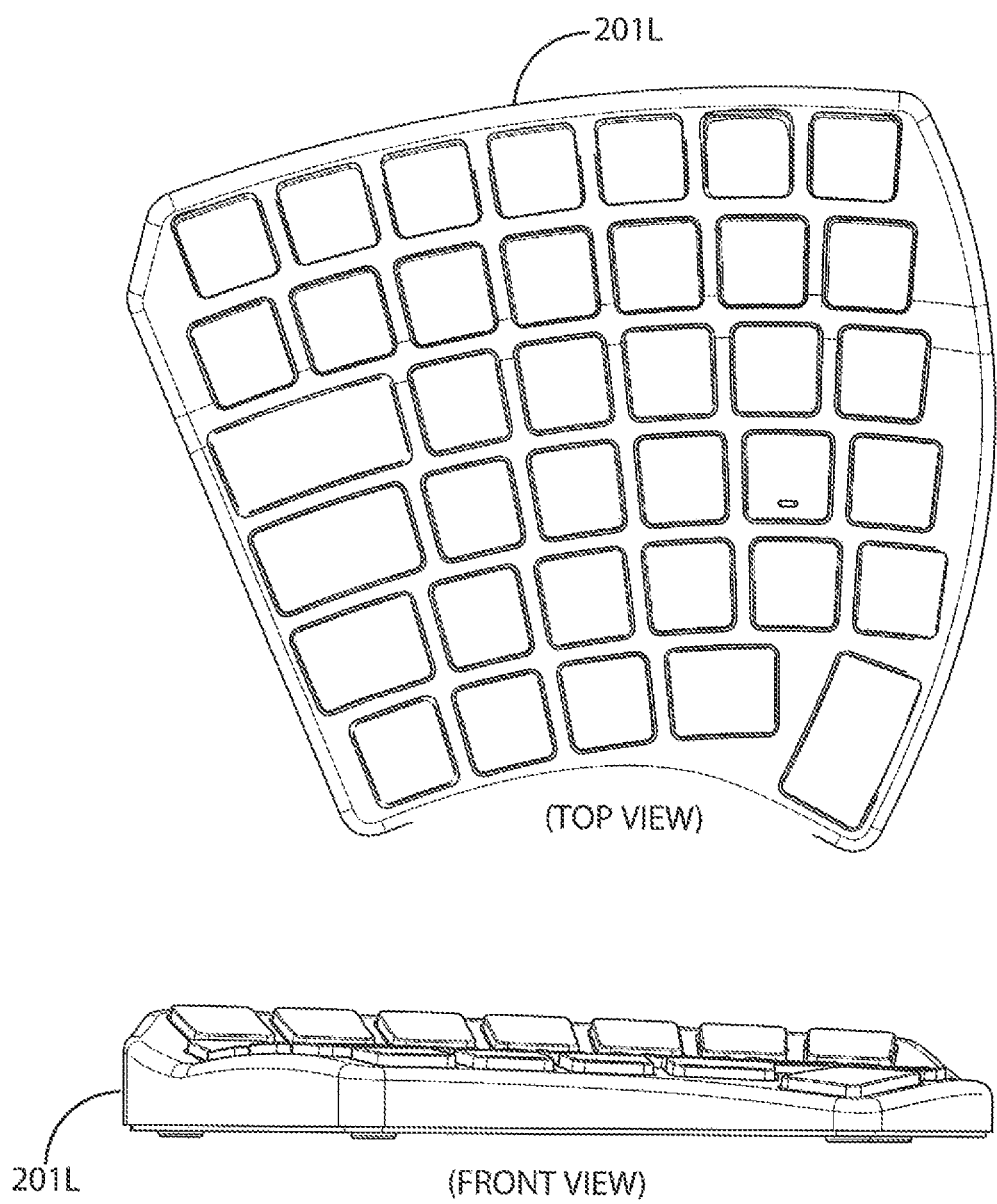
FIG. 2A illustrates a top view and a front view of another example left keyboard module.
Figure 2B:
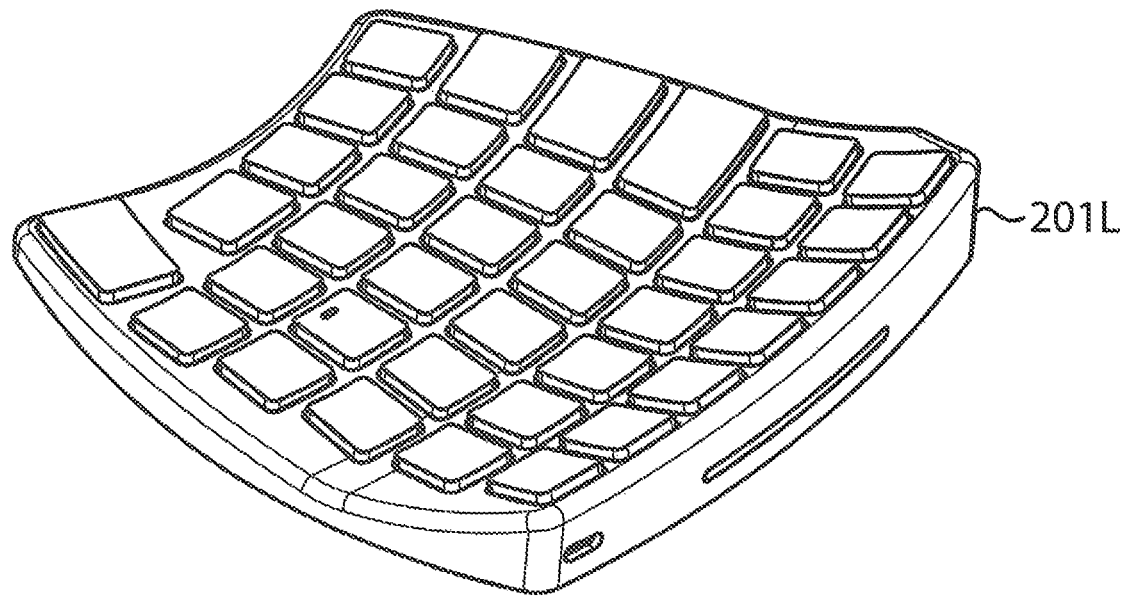
FIG. 2B illustrates an additional perspective views of the other example left keyboard module.
Figure 2B:
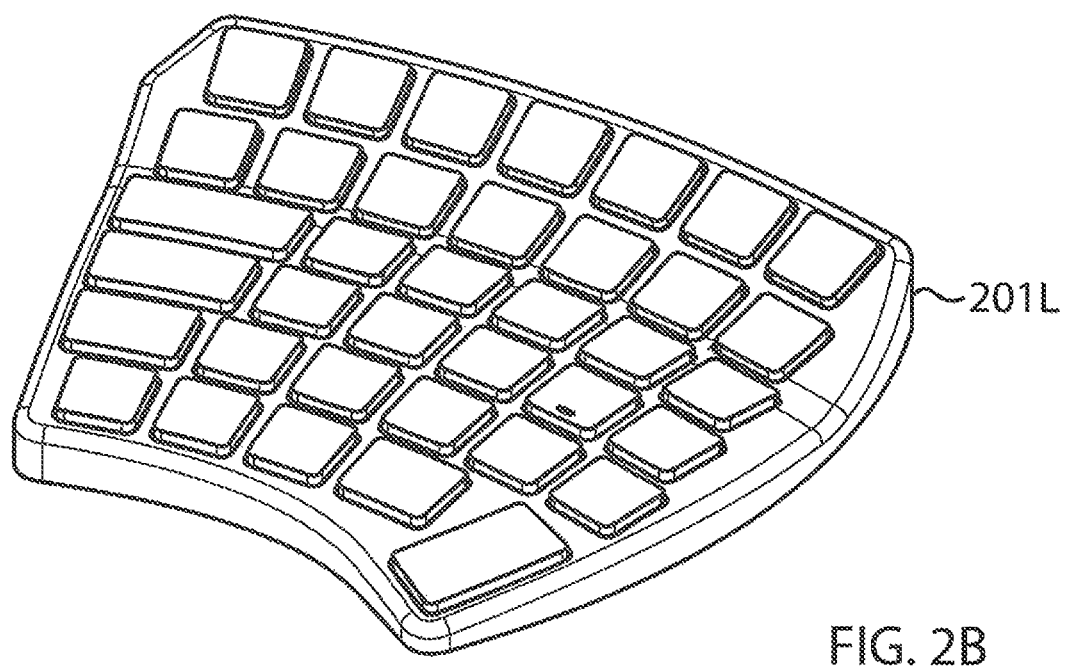

FIG. 2A illustrates a top view and a front view of another example left keyboard module 201L. As depicted in the front view, the keys of left keyboard module 201L rise slightly vertically from front to back (a stadium orientation). The stadium orientation can reduce finger translation in an extended typing motion for less frequently used keys. FIG. 2B illustrates additional perspective views of left keyboard module 201L.

Figure 2C:
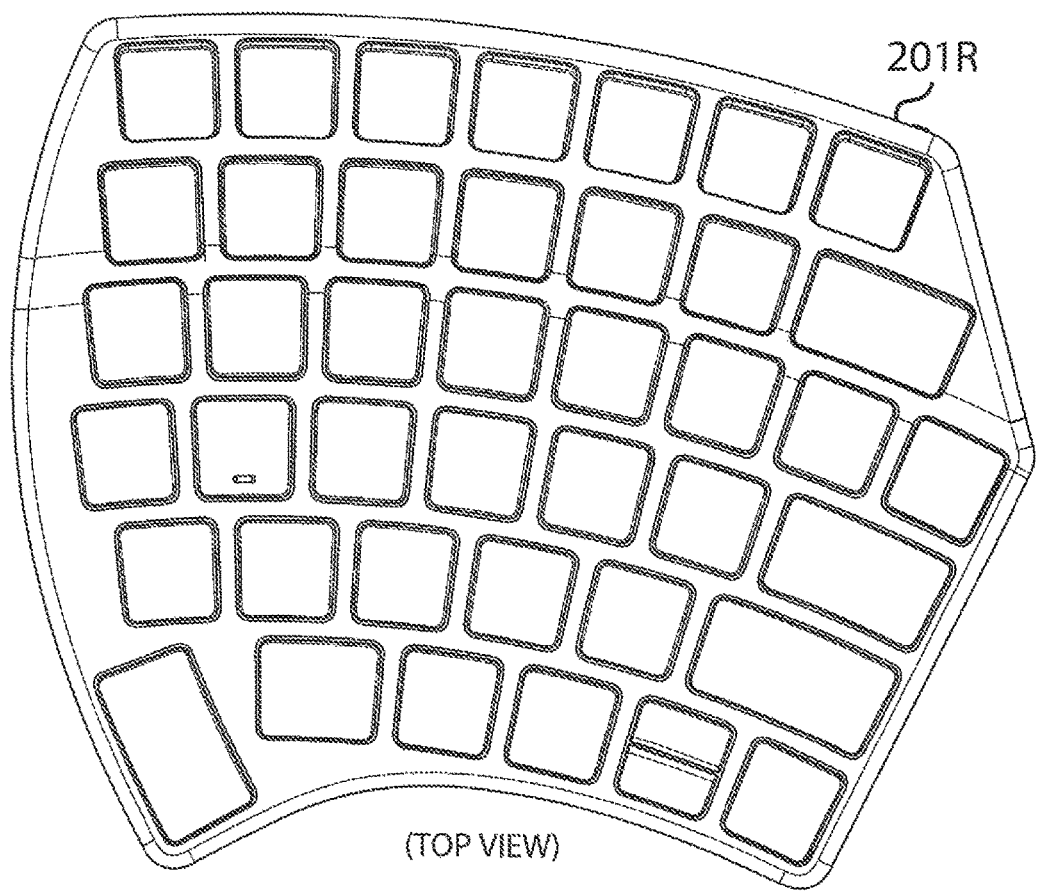
FIG. 2C illustrates a top view and a from view of another example right keyboard module.
Figure 2C:
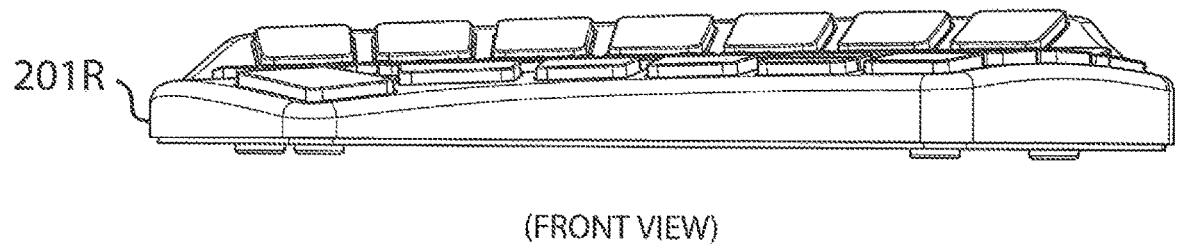
Figure 2D:
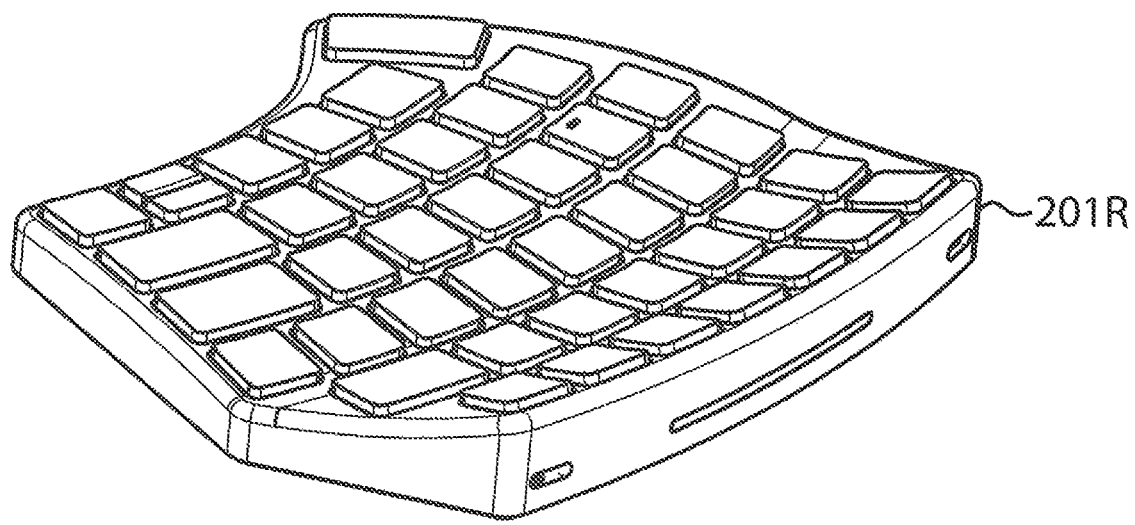
FIG. 2D illustrates an additional perspective views of the other example right keyboard module.
Figure 2D:
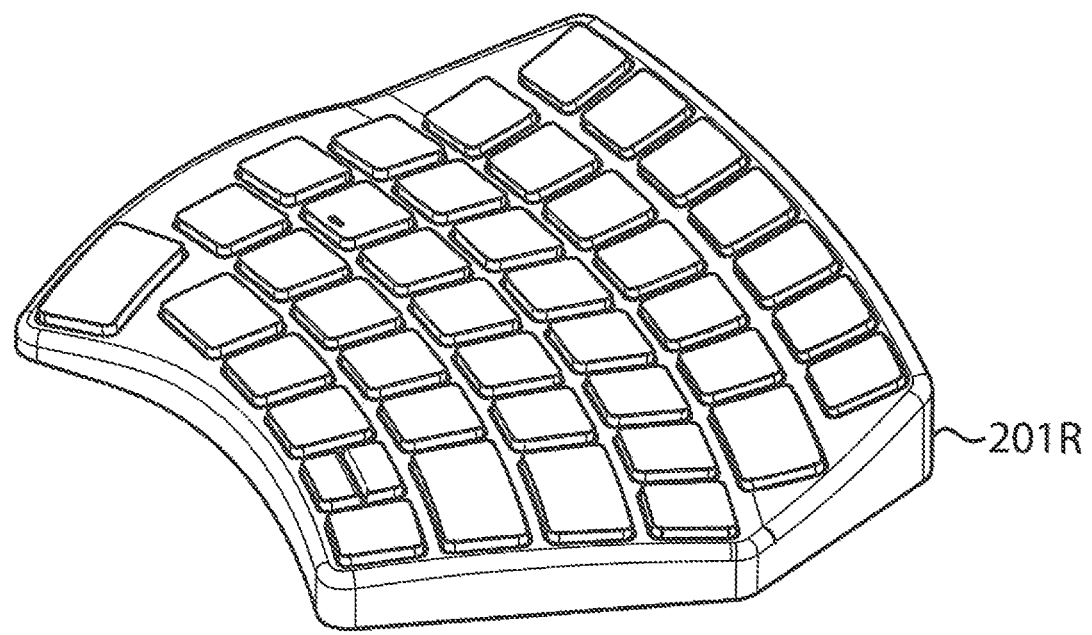

FIG. 2C illustrates a top view and a from view of another example right keyboard module 201R. As depicted in the front view, the keys of right keyboard module 201R rise slightly vertically from front to back (a stadium orientation). The stadium orientation can reduce finger translation in an extended typing motion for less frequently used keys. FIG. 2D illustrates additional perspective views of left keyboard module 201L.

Figure 2E:
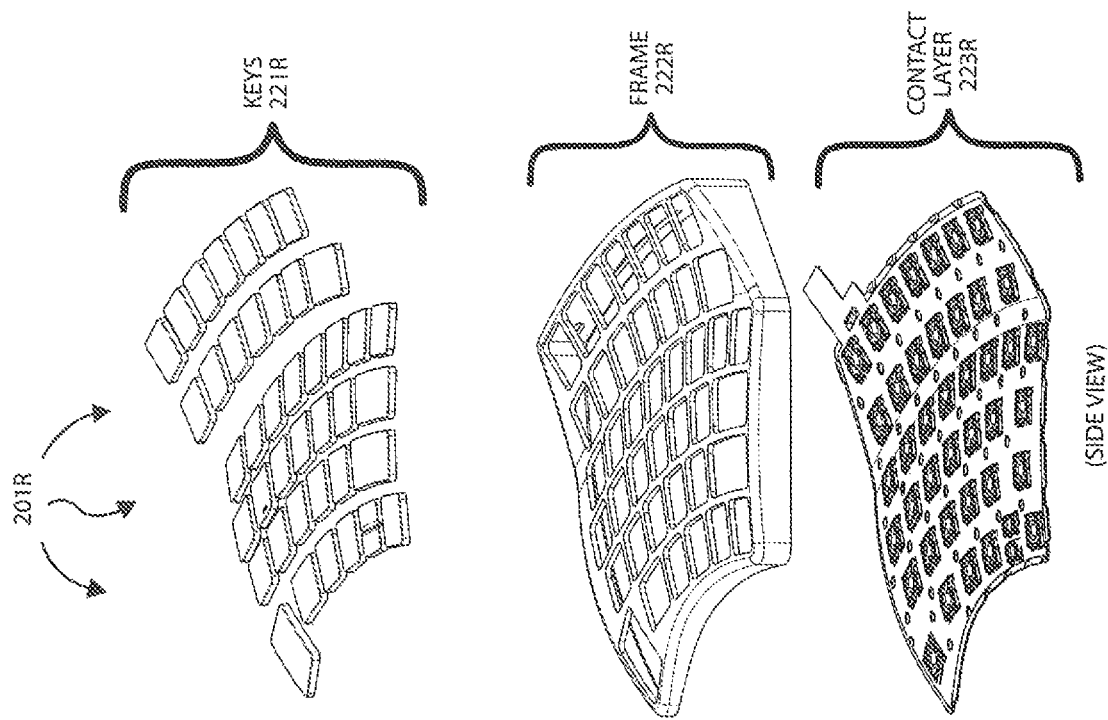
FIG. 2E illustrates a front view and a side view of components included in the other example right keyboard module.
Figure 2E:
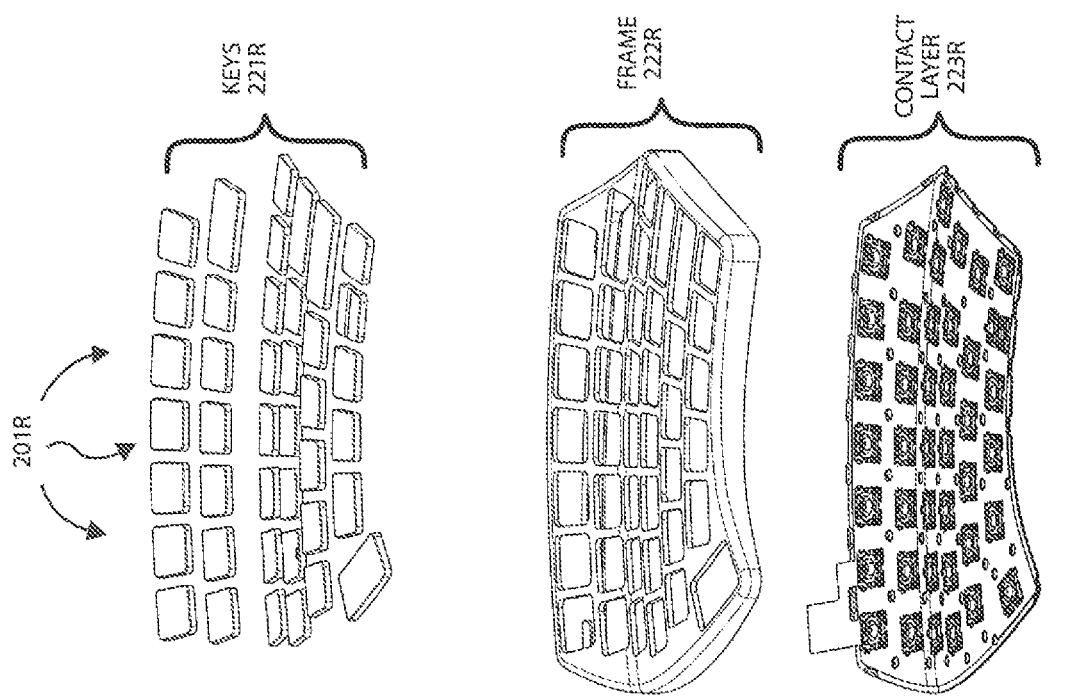

FIG. 2E illustrates a front view and a side view of components included in right keyboard module 201R. As depicted, right keyboard module 201R includes keys 221R, frame 222R, and contact layer 223R. Left keyboard module 201L can include similar components such as, for example, keys, a frame, and a contact layer.

Figure 3A:
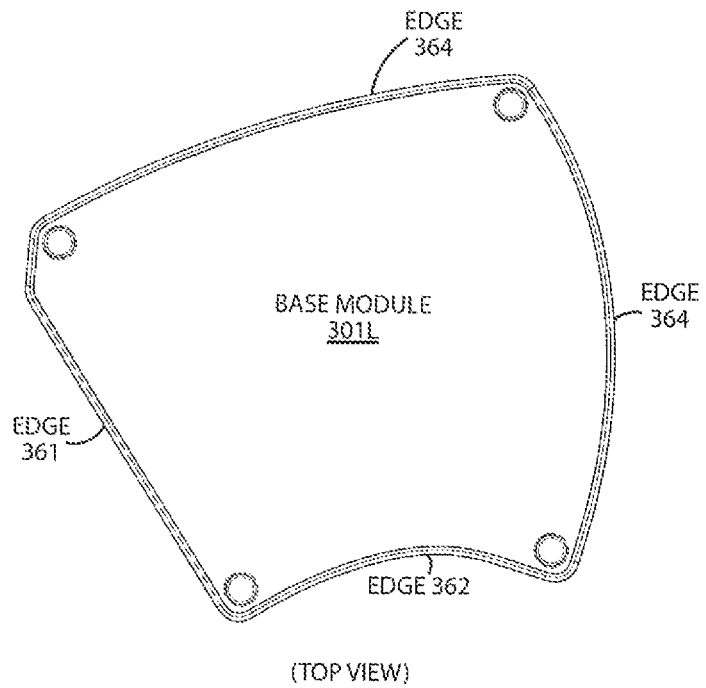
FIG. 3A illustrates a top view and a perspective view of a left base module.
Figure 3A:
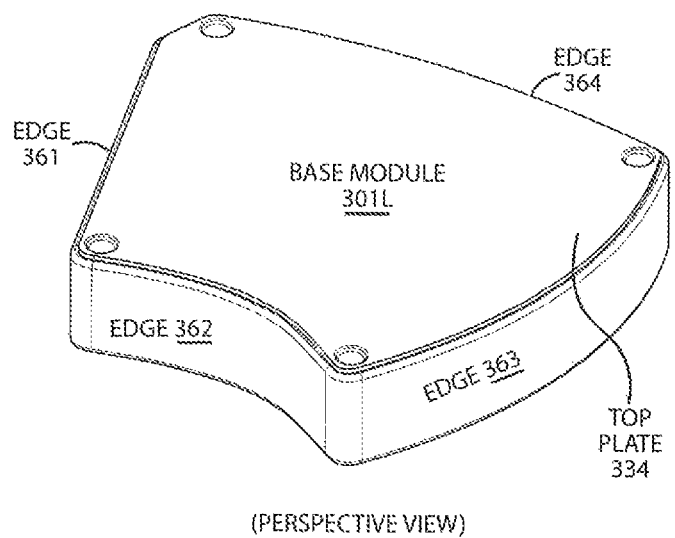
Figure 3B:
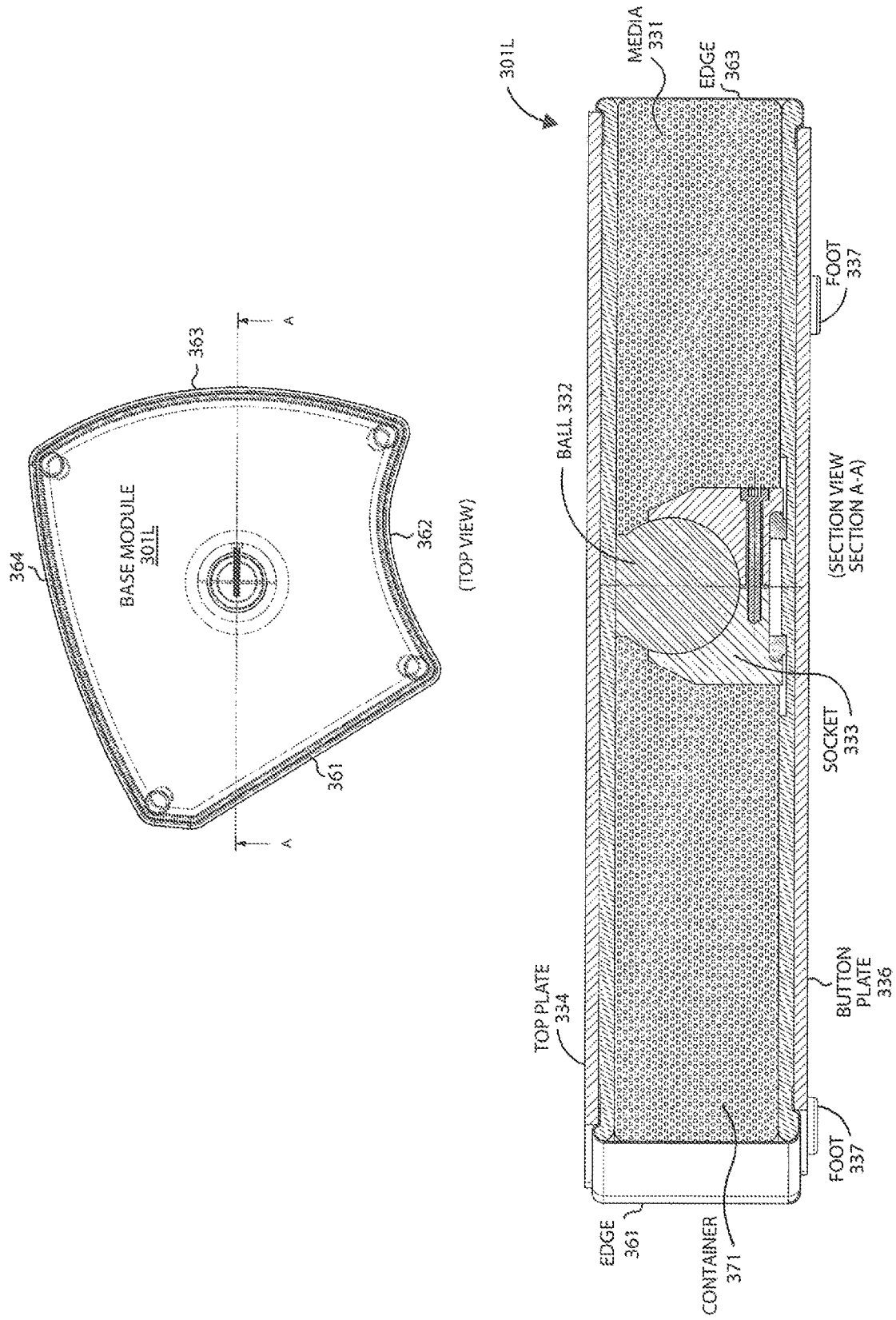
FIG. 3B illustrates a top view and a section view of the left base module.

FIG. 3A illustrates a top view and a perspective view of a left base module 301L. FIG. 3B illustrates a top view and a section view of left base module 301L. Base module 301L includes container 371 constructed of material (e.g., fabric, plastic or vinyl) that can stretch and/or compact. Container 371 can contain media 331 such as, for example, PVC pellets, expanded polystyrene beads, or expanded polypropylene beads. Thus, container 371 may be similar to (or even be) a bean bag. In one aspect, container 371 is filled with media 331 prior to assembly of base module 301L. Base module 301L can include top plate 334 and bottom plate 336 mechanically secured to container 371.

Base module 301L has edges 361, 362, 363, and 364. Top plate 334, container 371, and bottom plate 336 can be configured with essentially the same foot print. Thus, edges 361, 362, 363, and 364 generally represent the edges of top plate 334, the edges of container 371, and the edges of bottom plate 336.

Top plate 334 can be configured to couple and/or attach (e.g., mechanically or magnetically) to left keyboard module 201L. Feet 337 are secured to bottom plate 336. Feet 337 can contact a surface, such as, for example, a desk or table.

Base module 301L also includes ball 332 and socket 333 inside container 371. A user can apply pressure to top plate 334 in different locations. When applied pressure is sufficient, the pressure causes ball 332 to pivot within socket 333 changing the orientation of top plate 334 relative to bottom plate 336. By applying pressure to different areas of top plate 334, a user can change, adjust, readjust, and/or tailor orientation of top plate 334 as desired. Changing the orientation of top plate 334 can compress one or more sides: 361, 362, 363, or 364 of container 371 and/or stretch one or more of sides: 361, 362, 363, or 364 of container 371.

In another aspect, ball 332 and socket 333 are replaced by one or more hinged plates or other adjustment mechanisms. In a further aspect, container 371 is not filled with media 331. In an additional aspect, base module 301L does not include container 371. Thus, ball 332 and socket 333, one or more hinged plates, or other adjustment mechanisms may be attached to top plate 334 and/or bottom plate 336.

When using other adjustment mechanisms (e.g., one or more hinged plates), sufficient applied pressure can also change the orientation of top plate 334 relative to bottom plate 336. Thus, a user can also change, adjust, readjust, and/or tailor orientation of top plate 334 as desired when using these other adjustment mechanisms.

Figure 3C:
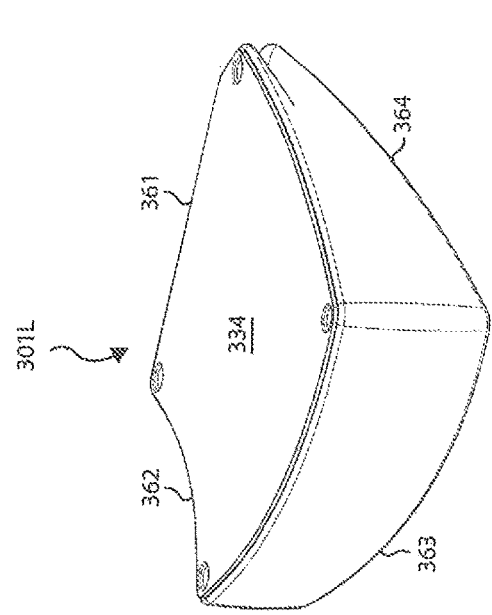
FIGS. 3C-3F illustrates different possible orientations of the left base module.

FIG. 3C illustrates an adjusted orientation of left base module 301L. When sufficient pressure is applied at or near corner 391 (i.e., where edges 361 and 362 meet), container 371 can compress at corner 391 and/or in the area around corner 391. Some of media 331 can be pushed away from corner 391 towards the interior of container 371. The media 331 can expand container 371 at corner 392 and/or in the area around corner 392 (i.e., where edges 363 and 364 meet).

Figure 3E:
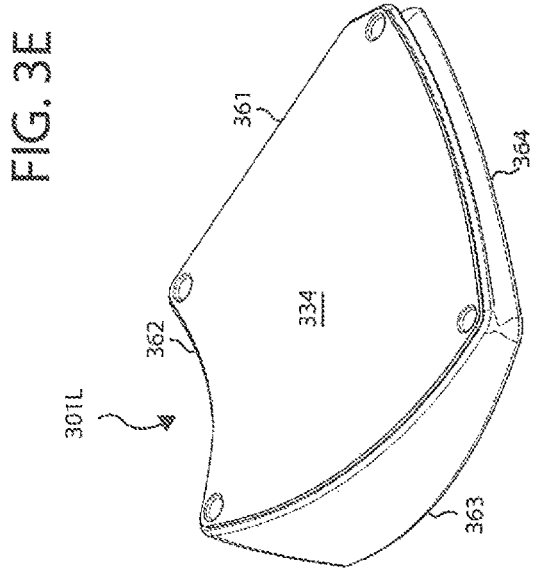
Figure 3D:
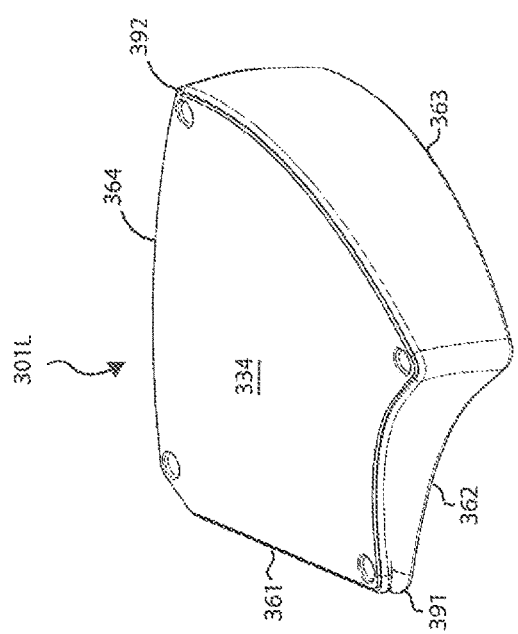

FIG. 3D illustrates another adjusted orientation of left base module 301L. When sufficient pressure is applied at or near corner 392, container 371 can compress at corner 392 and/or in the area around corner 392. Some of media 331 can be pushed away from corner 392 towards the interior of container 371. The media 331 can expand container 371 at corner 391 and/or in the area around corner 391.

FIG. 3E illustrates a further adjusted orientation of left base module 301A. When sufficient pressure is applied at or near the center of edge 361, container 371 can compress along edge 361 and/or in the area around edge 361. Some of media 331 can be pushed away from edge 361 towards the interior of container 371. The media 331 can expand container 371 along edge 363 and/or in the area around edge 363.

Figure 3F:
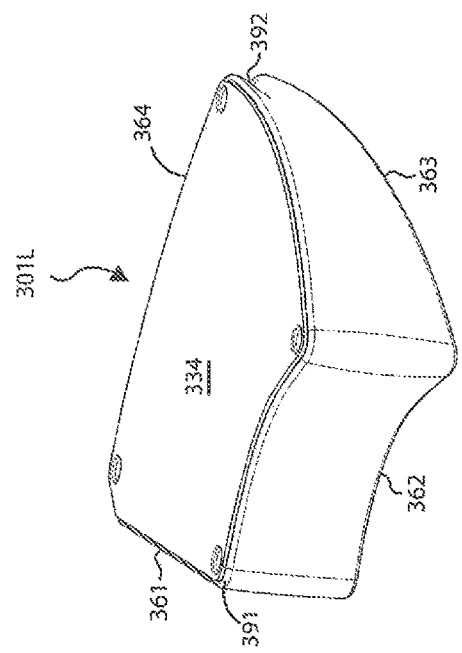

FIG. 3F illustrates a further adjusted orientation of left base module 301A. When sufficient pressure is applied at or near the center of edge 364, container 371 can compress along edge 364 and/or in the area around edge 364. Some of media 331 can be pushed away from edge 364 towards the interior of container 371. The media 331 can expand container 371 along edge 362 and/or in the area around edge 362.

Figure 4A:
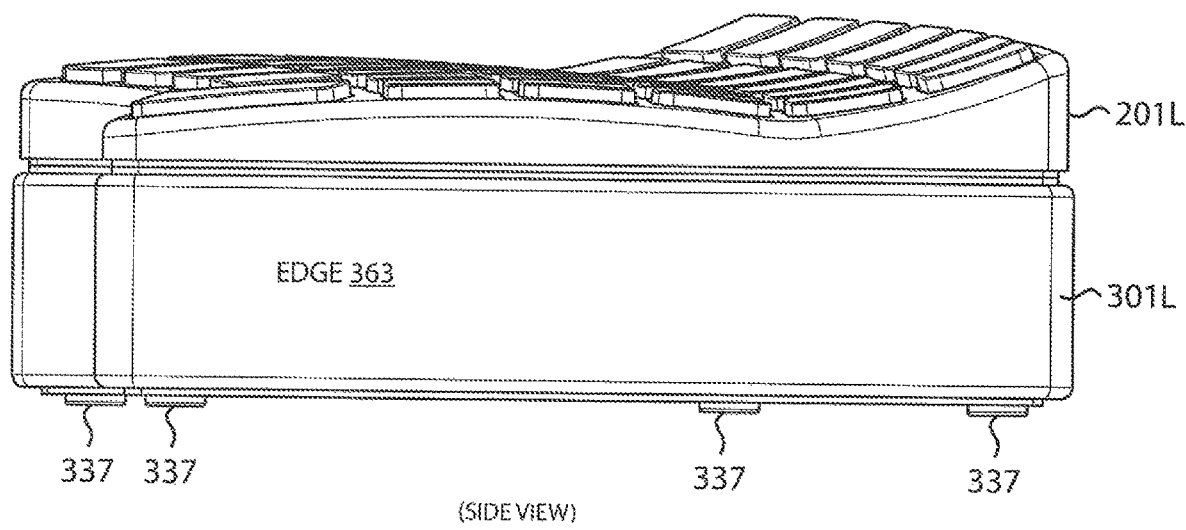
FIG. 4A illustrates a perspective view and a side view of the other example left keyboard module coupled to the left base module.
Figure 4A:
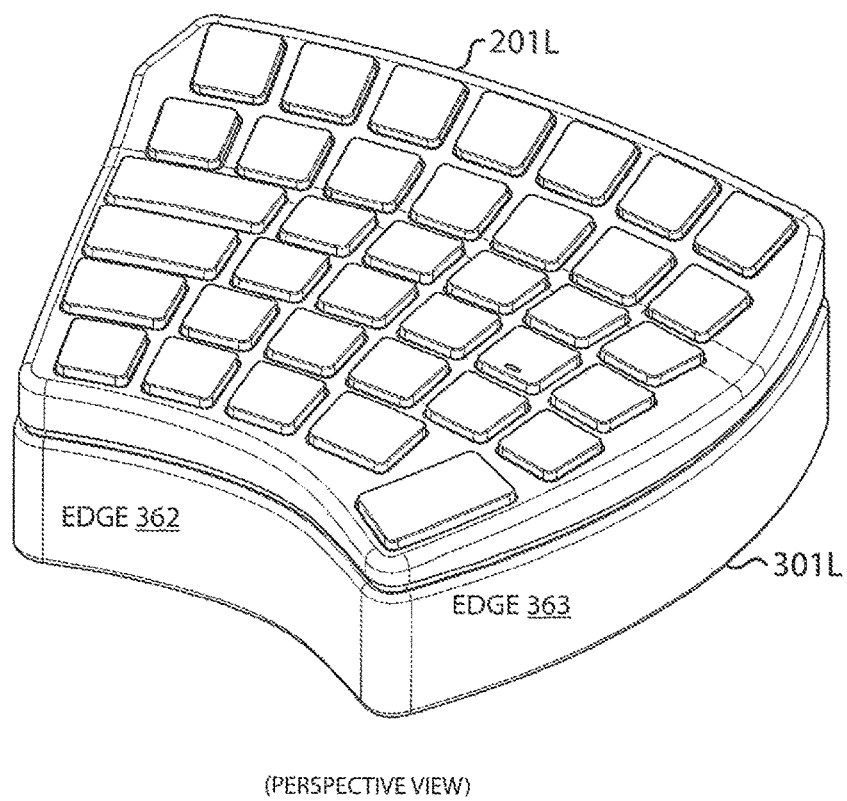

FIG. 4A illustrates a perspective view and a side view of the left keyboard module 201L coupled to the left base module 301L. Left keyboard module 201L can be mechanically and/or magnetically secured to left base module 301L.

Figure 4D:
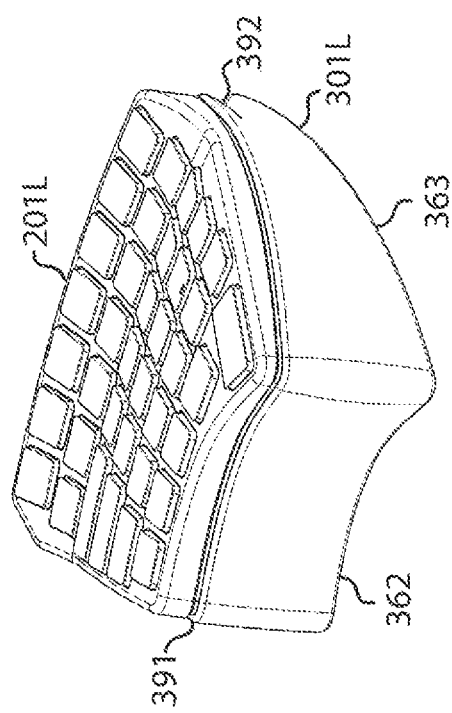
FIGS. 4B-4E illustrate the example left keyboard module coupled to the left base module in different orientations.
Figure 4E:
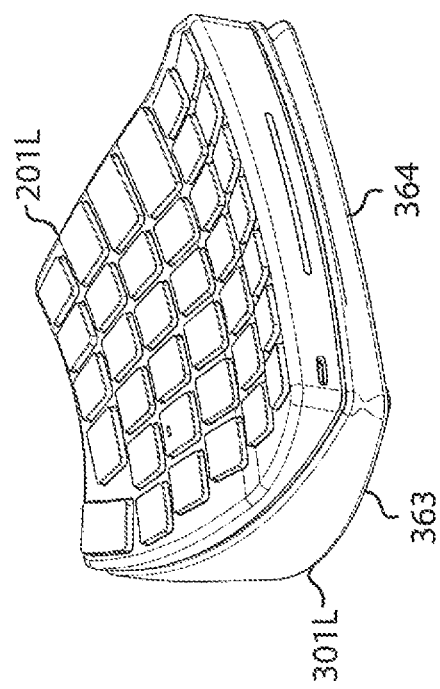
Figure 4B:
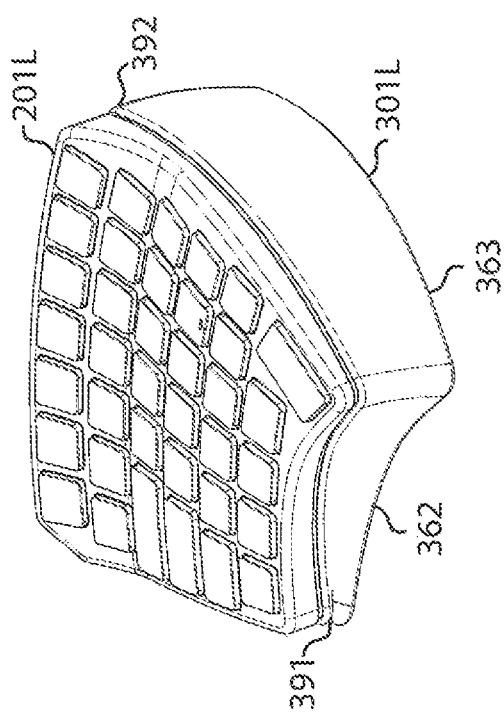
Figure 4C:
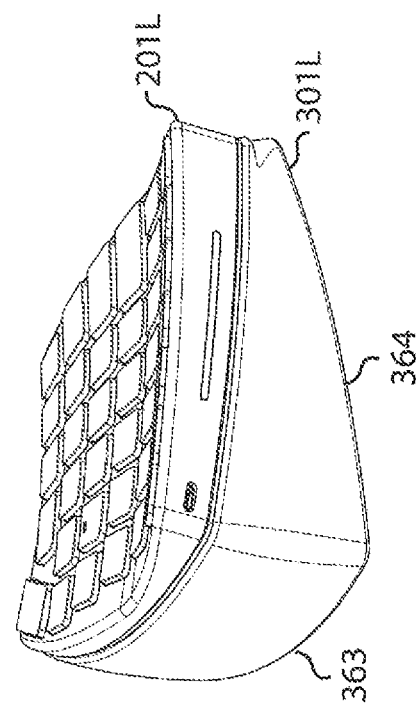

FIG. 4B illustrates left keyboard module 201L coupled to left base module 301L. In FIG. 4B, left base module 301L is in the adjusted orientation depicted in FIG. 3C. FIG. 4C illustrates left keyboard module 201L coupled to left base module 301L. In FIG. 4C, left base module 301L is in the adjusted orientation depicted in FIG. 3E. FIG. 4D illustrates left keyboard module 201L coupled to left base module 301L. In FIG. 4D, left base module 301L is in the adjusted orientation depicted in FIG. 3D. FIG. 4E illustrates left keyboard module 201L coupled to left base module 301L. In FIG. 4E, left base module 301L is in the adjusted orientation depicted in FIG. 3F.

A right base module similar to base module 301L can be configured to received right keyboard module 201R. The right base module can include a top plate, a container, and a bottom plate. The contain can contain media and a ball and socket joint. One or more feet can be secured to the bottom plate. Sufficient force can be applied to different areas on the top plate to change the orientation of the right base module. Right keyboard module can be mechanically and/or magnetically secured to right base module.

Since left and right base modules are separate, different desired orientations for left keyboard module 201L and right key board 201R can be implemented.

Media within container 371 can provide sufficient support to sustain the orientation of top plate 334 when keys of left keyboard module 201L are depressed. Similarly, media within a container of a right base module can provide sufficient support to sustain the orientation of top plate when keys of right keyboard module 201R are depressed. Alternately, mechanical components integrated into a left base module and/or into a right base module can provide sufficient support to sustain the orientation of a corresponding top plate.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

What is claimed:

1. An apparatus comprising:
    a closed container including a ball and socket joint inside the closed container, the closed container containing particulate media at least partially filling the closed container and filling the closed container around the ball and socket joint;
    a top plate attached to the closed container and configured to couple to a matched keyboard module;
    a bottom plate attached to the closed container; and
    one or more feet secured to the bottom plate;
    wherein the ball and socket joint is configured to pivot in response to sufficient pressure applied to the top plate to change the orientation of the top plate relative to the orientation of bottom plate and the ball and socket joint in combination with the particulate media is sufficiently rigid to hold the orientation of the top plate relative to the orientation of the bottom plate when applied pressure is less than the sufficient pressure.

2. The apparatus of claim 1, wherein the closed container is constructed from one or more of: fabric, plastic, and vinyl.

3. The apparatus of claim 1, wherein the particulate media comprises one or more of: PVC pellets, expanded polystyrene beads, and expanded polypropylene beads.

4. The apparatus of claim 1, further comprising the keyboard module attached to the top plate and including one or more keyboard keys;
    wherein the ball and socket joint being sufficiently rigid comprises the ball and socket joint being sufficiently rigid to maintain the orientation of the top plate when a keyboard key, from among the one or more keyboards keys, is depressed.

5. The apparatus of claim 4, wherein the keyboard module comprises a 3D shaped keyboard including an input device selected from among: a stick, a trackball, a click wheel, and a trackpad.

6. The apparatus of claim 4, wherein the keyboard module comprises a 3D shaped keyboard optimized for one or more of: finger typing position and hand typing position.

7. The apparatus of claim 4, wherein the keyboard module comprises:
    a 3D enclosure; and
    a 3D shaped keyboard laser wielded to the 3D enclosure.

8. The apparatus of claim 4, wherein the keyboard module further comprises:
    a frame matched to the one or more keyboard keys; and
    a contact layer including a contact per each of the one or more keyboard keys.

9. The apparatus of claim 1, wherein the ball and socket joint being configured to pivot comprises the ball and socket joint being configured to change one or more of: yaw, tilt, and roll of the top plate.

10. An apparatus comprising:
    a top plate attached to a closed container and configured to couple to a matched keyboard module;
    a bottom plate attached to the closed container;
    one or more feet secured to the bottom plate;
    one more hinged plates inside the closed container and configured to move in response to sufficient pressure applied to the top plate to change the orientation of the top plate and relative to the orientation of the bottom plate;
    particulate media, including a plurality of beads or pellets, at least partially filling the closed container and filling the closed container around the one or more hinged plates;
    wherein the particulate media is sufficiently rigid to hold the one or more hinged plates and hold the orientation of the top plate relative to the orientation of the bottom plate when applied pressure is less than the sufficient pressure.

11. The apparatus of claim 10, further comprising the keyboard module attached to the top plate and including one or more keyboard keys;

wherein the particulate media being sufficiently rigid comprises the particulate media being sufficiently rigid to maintain the orientation of the top plate when a keyboard key, from among the one or more keyboards keys, is depressed.

12. The apparatus of claim 11, wherein the keyboard module comprises a 3D shaped keyboard including an input device selected from among: a stick, a trackball, a click wheel, and a trackpad.

13. The apparatus of claim 11, wherein the keyboard module comprises a keyboard optimized for one or more of: finger typing position and hand typing position.

14. The apparatus of claim 11, wherein the keyboard module comprises:
- a 3D enclosure; and
- a 3D shaped keyboard mechanism laser wielded to the 3D enclosure.

15. The apparatus of claim 11, wherein the keyboard module further comprises:
- a frame matched to the one or more keyboard keys; and
- a contact layer including a contact per each of the one or more keyboard keys.

16. The apparatus of claim 11, wherein the keyboard module comprises:
- a 3D enclosure; and
- a 3D shaped keyboard mechanism laser wielded to the 3D enclosure.

17. The apparatus of claim 10, wherein the positioning mechanism being configured to move comprises the positioning mechanism being configured to change one or more of: yaw, tilt, and roll of the top plate.

18. The apparatus of claim 10, wherein the particulate media comprises one or more of: PVC pellets, expanded polystyrene beads, and expanded polypropylene beads.

19. An apparatus comprising:
- a top plate attached to a closed container and configured to couple to a matched keyboard module;
- a bottom plate attached to the closed container;
- one or more feet secured to the bottom plate;
- a ball and socket joint inside the closed container and configured to move in response to sufficient pressure applied to the top plate to change the orientation of the top plate relative to the orientation of the bottom plate; and
- particulate media, including a plurality of beads or pellets, at least partially filling the closed container and filling the closed container around the ball and socket joint;
- wherein the particulate media is sufficiently rigid to hold the ball and socket joint and hold the orientation of the top plate relative to the orientation of the bottom plate when applied pressure is less than the sufficient pressure.

20. The apparatus of claim 19, further comprising the keyboard module attached to the top plate and including one or more keyboard keys;
- wherein the particulate media being sufficiently rigid comprises the particulate media being sufficiently rigid to maintain the orientation of the top plate when a keyboard key, from among the one or more keyboards keys, is depressed.

* * * * *